United States Patent
Hehl (10) Patent No.: US 7,854,606 B2
(45) Date of Patent: Dec. 21, 2010

(54) INJECTION MOLDING MACHINE FOR PROCESSING PLASTICS MATERIALS

(76) Inventor: Karl Hehl, Arthur-Hehl-Strasse, Lossburg (DE) 72290

( * ) Notice: Subject to any disclaimer, the term of this patent is extended or adjusted under 35 U.S.C. 154(b) by 722 days.

(21) Appl. No.: 11/815,892

(22) PCT Filed: Feb. 7, 2006

(86) PCT No.: PCT/EP2006/001078
§ 371 (c)(1),
(2), (4) Date: Aug. 9, 2007

(87) PCT Pub. No.: WO2006/084668
PCT Pub. Date: Aug. 17, 2006

(65) Prior Publication Data
US 2010/0129483 A1    May 27, 2010

(30) Foreign Application Priority Data
Feb. 11, 2005   (DE) ................. 10 2005 006 596

(51) Int. Cl.
*B29C 45/64*   (2006.01)
(52) U.S. Cl. ................. 425/589; 425/593; 425/595
(58) Field of Classification Search ................. 425/589, 425/593, 595, 450.1, 451.6, 451.9
See application file for complete search history.

(56) References Cited

U.S. PATENT DOCUMENTS 2,266,129 A    12/1941   Tegarty
5,297,897 A    3/1994    Venrooij et al.

(Continued)

FOREIGN PATENT DOCUMENTS

DE    10122599    11/2002

(Continued)

OTHER PUBLICATIONS

International Search Report; PCT/EP2006/001078; May 24, 2006.

*Primary Examiner*—James Mackey
(74) *Attorney, Agent, or Firm*—Cantor Colburn LLP (57) ABSTRACT

The invention relates to an injection molding machine comprising a machine frame (10), an injection molding unit (S, S') and a mold closing unit (F). Said mold closing unit (F) is provided with a stationary element and a movable mold support (12) which are fixed thereto, wherein said movable mold support (12) is mounted in front of the stationary element and is displaceable on a guiding elements (11) in the direction of closing (s-s) in and out of a positive locking, wherein the mold closing unit (f) is provided with, fixed thereto, the machine frame (10) or at least a part thereof in the form of a stationary mold carrier (13) and the movable mold support (12) displaceable with respect to said stationary mold carrier (13) on the guiding elements (11). The other parts of the mold closing unit (F) is movable in a positive locking with respect to the stationary mold carrier (13). The mold closing unit (F) comprises a drive unit for displacing the movable mold support (12), and is actively connected to the stationary mold carrier (13) and to the movable mold support (12) by means of at least one force-transmission element. One end of the drive element (A) is hinged about the machine frame (10) or the stationary mold carrier (13) and the other end thereof is hinged about a support plate (14) which is movable in the direction of closing (s-s) and is connected to the force-transmission element. In the preferred embodiment, said force-transmission element is embodied in the form of a stirrup piece (15).

12 Claims, 8 Drawing Sheets

U.S. PATENT DOCUMENTS

| | | | |
|---|---|---|---|
| 5,306,136 A | | 4/1994 | Oomori et al. |
| 5,354,196 A | * | 10/1994 | Ziv-Av .................. 425/589 |
| 5,578,329 A | * | 11/1996 | Hehl .................... 425/589 |
| 6,402,497 B1 | | 6/2002 | Banjyo et al. |
| 6,821,105 B1 | | 11/2004 | Fischbach |
| 2003/0039719 A1 | * | 2/2003 | Armbruster ............ 425/593 |

FOREIGN PATENT DOCUMENTS

| | | |
|---|---|---|
| EP | 0554068 | 8/1993 |
| EP | 1285739 | 2/2003 |
| JP | 08057896 | 3/1996 |

* cited by examiner

INJECTION MOLDING MACHINE FOR PROCESSING PLASTICS MATERIALS

CROSS REFERENCE TO RELATED APPLICATIONS

The present application claims priority from German patent application 10 2005 006 596.1, filed on Nov. 2, 2005, the disclosure content of which is hereby expressly also made the object of the present application.

TECHNICAL FIELD OF THE INVENTION

The invention relates to an injection moulding machine for processing plastics materials and other plasticisable compounds.

BRIEF DISCUSSION OF RELATED ART

Such a mould closing unit is known in DE 101 22 599 A1. The mould together with its braces guided at the stationary mould carrier is pulled into mould closure by means of a toggle mechanism that is located at the side of the injection moulding unit. The access to the injection mould is affected by the braces.

A solution that is comparable to DE 101 22 599 A1 also comprising braces is known from U.S. Pat. No. 5,297,897 in the field of transfer moulding.

The use of brackets as force transmitting element is on its own known since long from U.S. Pat. No. 2,266,129 A, however, not its pivoting to the moveable mould carrier.

Figure 1:
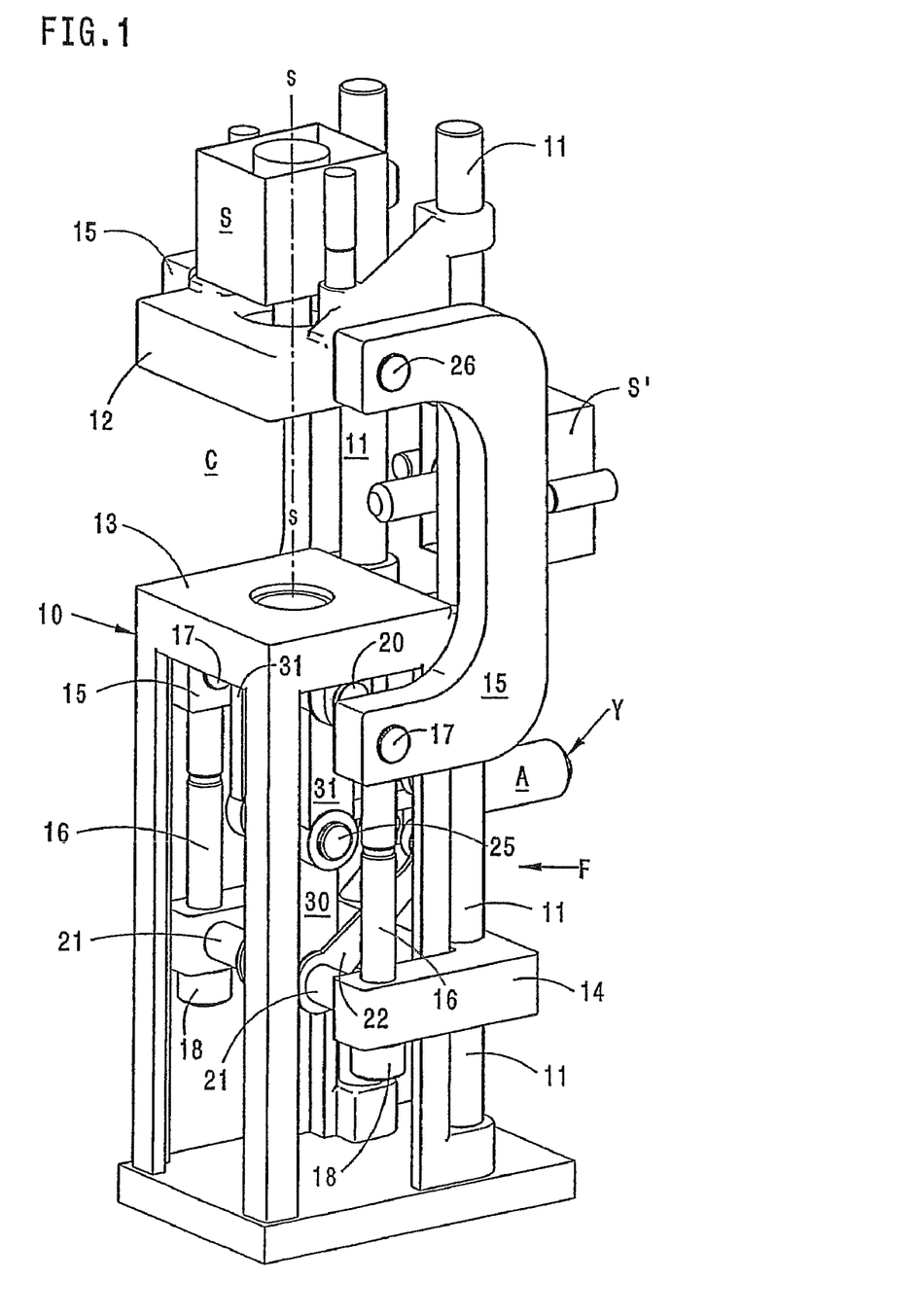
FIG. 1 is a side view in perspective of an injection molding machine with injection molded units cut off.

A mould closing unit is known from DE 69 12 191 U1, more especially in FIG. 1, where the stationary mould carrier at the same time supports the drive unit for the mould closing unit. The moveable mould carrier is pulled to the stationary mould carrier by means of the said drive unit during mould closure.

BRIEF SUMMARY OF THE INVENTION

Proceeding from this state of the art, the invention creates a space saving-injection moulding machine enabling the design of a clearance system or an open space in the mould region.

The machine frame itself is the stationary mold carrier, relative to which the entire mold closure arrangement including the supporting element is displaceable. This does increase the mass that has to be displaced, however at the same time, more especially in the case of a vertical arrangement, it also enables a space-saving design. This means that it is easier to integrate the injection molding machine as an individual process into a total of production steps. This is more especially necessary in the production of complex components, such as the developing of the ends of cables, such as, for example plug-in connections or sealing systems used in the area of automobiles or injection systems for the processing, for example, of endless material such as electric contacts.

A bracket is used as a force transmitting element. This means that it is even easier to incorporate the injection moulding machine into existing production systems as it is possible for material coming from other processes to run through the mould region without any problems. At the same time, the length of the bracket can be kept short, which means that fewer eccentric extensions occur.

Further advantages are produced from the additional claims and the following description.

BRIEF DESCRIPTION OF THE FIGURES

The invention is described in more detail below by way of the attached Figures. In which.

DETAILED DESCRIPTION OF PREFERRED EMBODIMENTS

The invention is now described in more detail as an example with reference to the attached drawings. However, the exemplified embodiments are only examples which are not to restrict the inventive concept to any one specific arrangement.

Before the invention is described in detail, it must be pointed out that is it not restricted to the respective components of the injection molding machine or the mentioned method of operation as it is possible to vary the said components and method. The terms used in this case are purely determined to describe particular specific embodiments and are not used in a restrictive manner. If in the description and in the claims the singular or indefinite articles are used, they also refer to the plural of the said elements as long as the overall context does not make clear something to the contrary. The same is applicable in reverse.

The injection molding machine represented in the Figures is for processing plastics materials and other plasticisable compounds, such as powdered or ceramic compounds. In the drawings it is represented in the form of a vertically operating machine, which means that the closing direction (s-s) extends in a vertical manner. However, the machine can also be used operating in a horizontal manner. The machine is more especially provided to be integrated into other production processes. In this case, the injection molding technology is simply a part step of a production process, as is more especially necessary for the production of complex components, such as the developing of the ends of cables, for example in the production of plug-in connectors or sealing systems in automotive construction or as injection systems in the processing, for example, of endless material for electric contacts.

The elements of the injection molding machine, which include at least one injection molding unit S, S' and one mold closing unit F, are disposed on a stationary machine frame 10. In the operating state, injection molding unit S and mold closing unit F are operationally connected to the machine frame 10. The mold closing unit F includes a stationary element and a mold carrier 12, which, relative to the said stationary element, is guided at guide elements 11 and is displaceable in and out of the mold closing arrangement in a closing direction s-s. To move the moveable mold carrier 12, the mold closing unit F is operationally connected to the stationary element as well as to the moveable mold carrier 12 by means of at least one force transmitting element. The machine frame 10 or at least a part thereof is at the same time in the form of a stationary element or respectively in the form of stationary mold carrier 13. In the embodiment, this is the horizontal top side of the machine frame 10. The said machine frame is consequently the only stationary element, relative to which all the other elements of at least the mold closing unit are displaceable as a displaceable mold closing arrangement and are guided preferably also at the guide elements 11. In the embodiment, the guide elements 11 are stationary guide braces or guide columns, which, at the same time, also act as support braces for the upper parts of the injection molding machine. Depending on the specific embodiment, linear guides can also be provided in place of the said guides, wherein in the case of the linear guides, guide shoes would engage guide strips. The guide elements 11 do not have to be stationary. They can also be displaced with the mold closure arrangement if they are guided, for example, in their turn so as to slide in sleeves.

The mold closing unit F engages the stationary element with its one end and is mounted with its other end at a support plate 14, which is displaced along the guide elements, in the embodiment in the vertical direction, when the drive unit A is actuated. At least one force transmitting element is connected to the support element 14, the said force transmitting element being connected at the other end to the moveable mold carrier 12, which is also guided at the guide element 11. In a manner that is not represented in the drawings, the force transmitting elements, where required, can also be guided at the guide elements 11. Additional guide elements could also be provided in place of the guide elements 11 for the moveable mold carrier.

In the case of a vertical disposition as shown in the embodiment, this design leads to the entire mold closure arrangement, and where applicable also the injection molding unit S, having to be displaced at each cycle, on the other hand, however, it does create a fixed, free face that is easy to integrate into a production process as the horizontal fixed point by means of the top side of the machine frame 10 or respectively in the separating plane of the tool, with which it is then easier to align the rest of the production processes.

In the embodiment, the mold closing unit F includes a toggle mechanism Y as a drive mechanism, however, other drive mechanisms, such as, for example, hydraulic drives, electric drives or also combinations of such drives or even linear drives can be provided as the drive. The design of the toggle mechanism can be seen the clearest in FIG. 3. The toggle mechanism Y is pivotally connected at one end to the machine frame 10 or to the stationary element. In the embodiment, the pivotable connection is effected underneath the stationary mold carrier 13, that is to say underneath the top side of the machine frame. At the other end, the toggle mechanism Y is pivotally connected to the support plate 14, which is connected to the force transmitting element and is displaceable in the closing direction s-s. The support element 14 is guided at the guide elements 11, which also act as guide means in the upper region of the moveable mold carrier 12.

The Y toggle has a connecting element 19, on which the drive device A, for example in the form of a hollow shaft motor is disposed. The said connecting element is connected by means of two pivotal connecting points 27, 28 to retaining elements 22, 23, which are secured to the pivotal connecting points 20, 21 of the toggles 30, 31 of the toggle mechanism Y. These pivotal connecting points are the pivotal connecting points at the stationary element and at the support plate 14. By means of the retaining elements 22, 23 the drive device A is consequently suspended in a pivotable manner and is disposed transversely relative to the closing direction s-s and is retained by the toggle mechanism Y so as to be freely displaceable.

Figure 3:
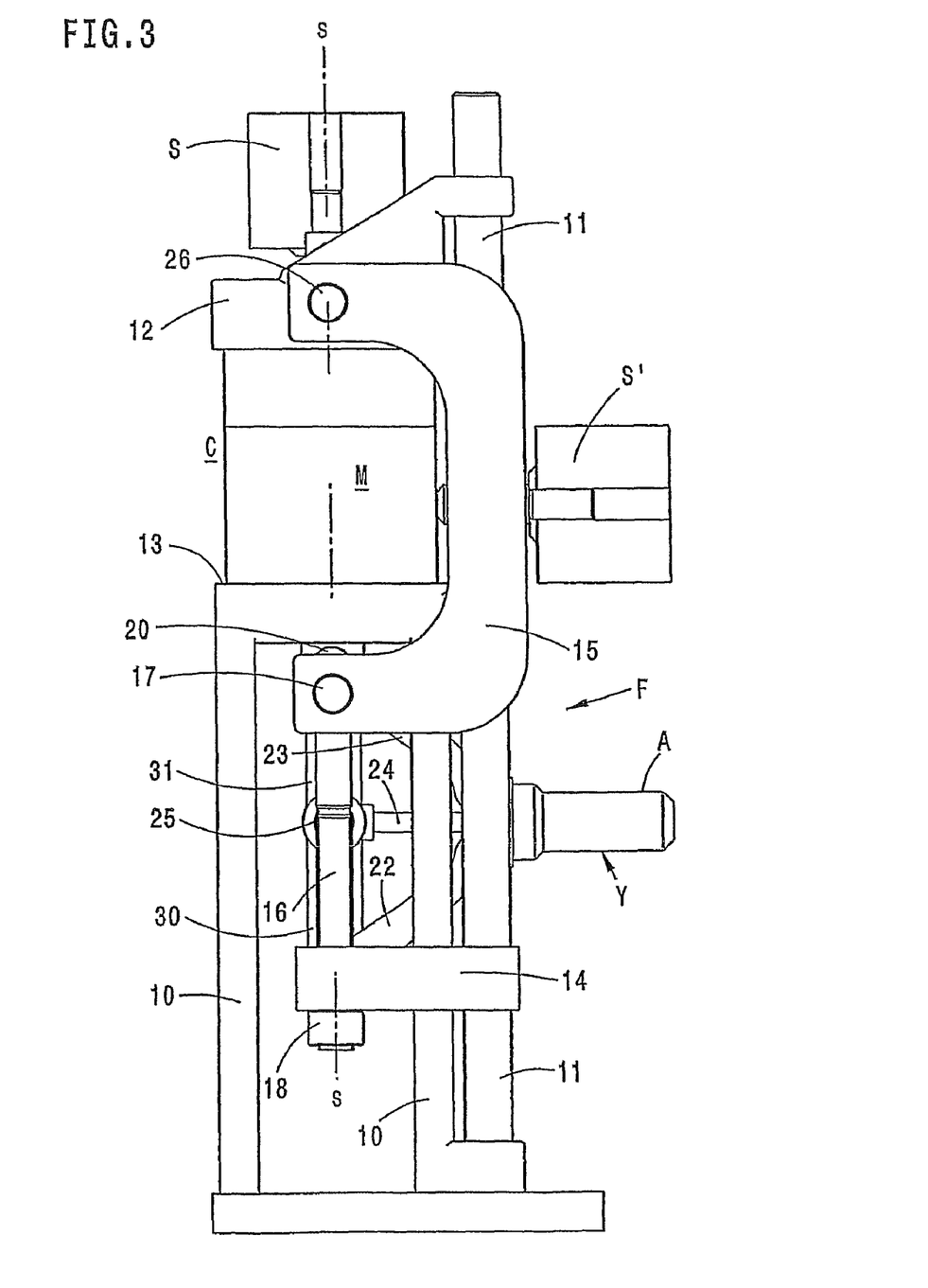
FIG. 3 is a side view of the injection molding machine in FIG. 1.

When the drive device A is actuated, the drive element 24 is moved transversely relative to the closing direction s-s, which leads to the stretched position of the toggles as shown in the Figures with mold closure. If the drive element 24 in FIG. 3 is pulled back to the right, also the pivotal connecting point 25 is moved to the right, which leads to a shortening in the distance between the pivotal connecting points 20, 21. This means that the support element 14, connecting element 16, force transmitting means (bracket 15) as well as injection mold unit S are displaced upwards, which leads to the opening of the injection mold.

Figure 2:
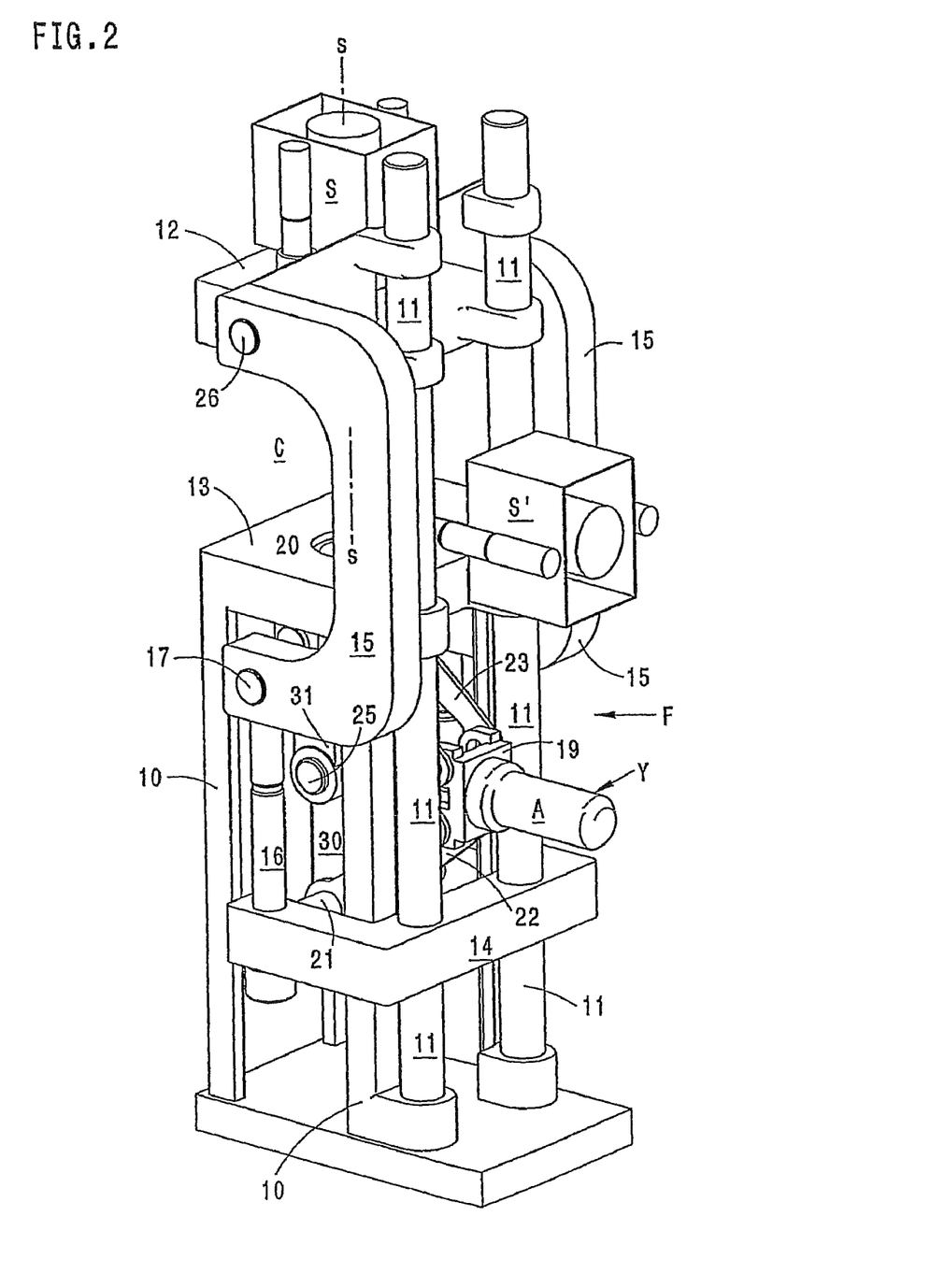
FIGS. 2, 2*a* are side views in perspective of the injection molding machine in FIG. 1 from the rear and from the front.
Figure 2A:
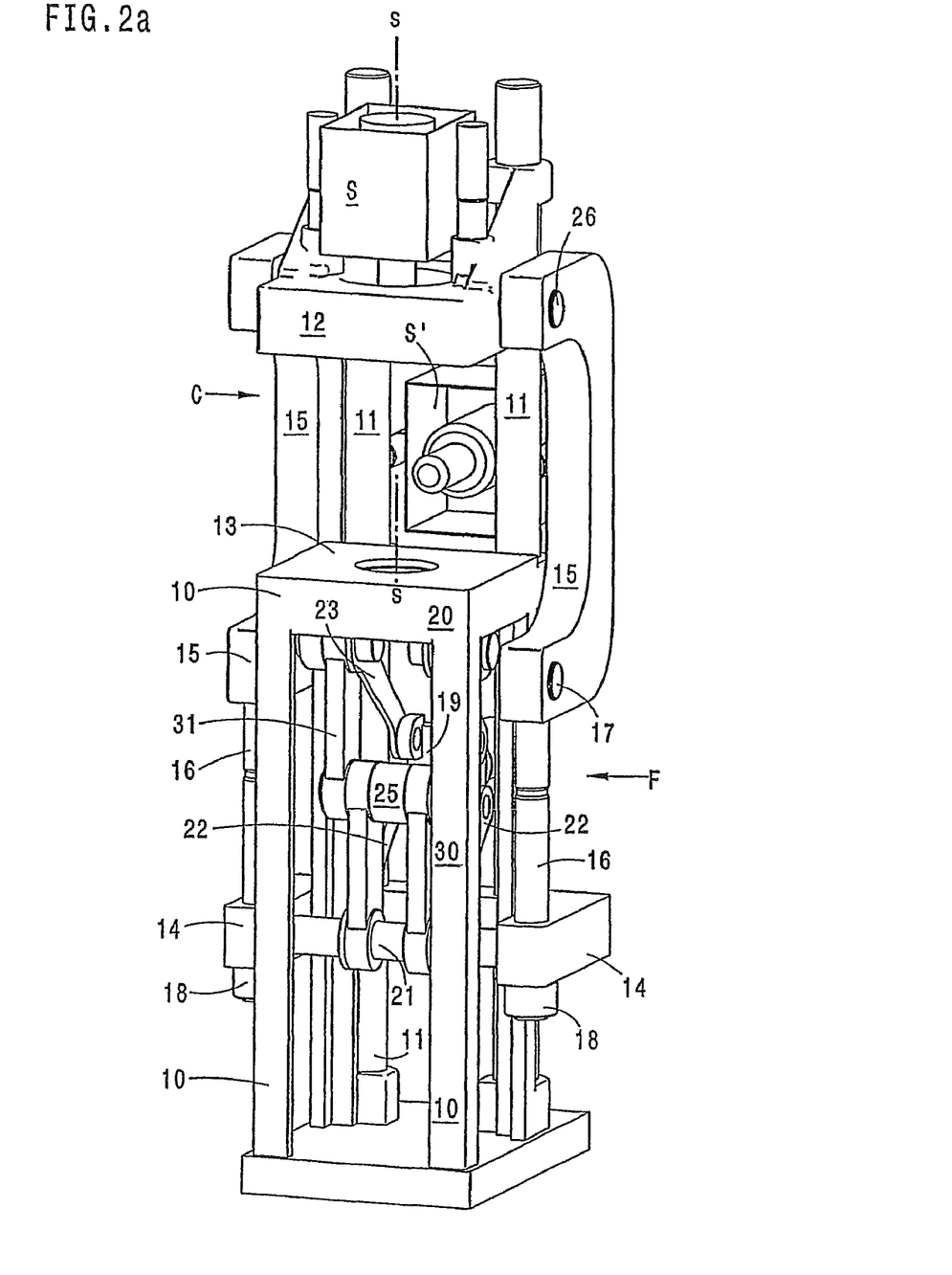
Figure 4:
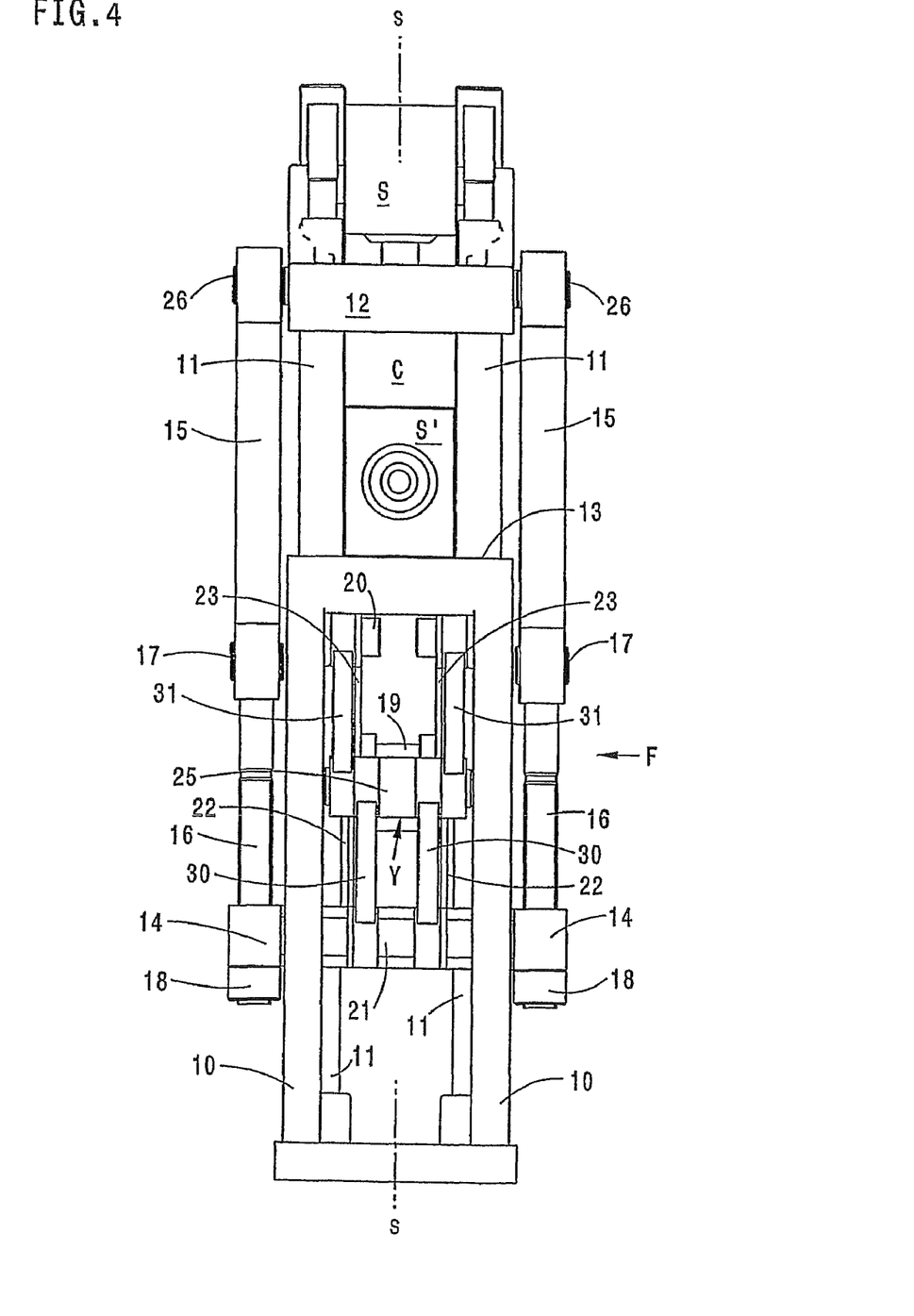
FIG. 4 is a front view the of the injection molding machine in FIG. 1.
Figure 5:
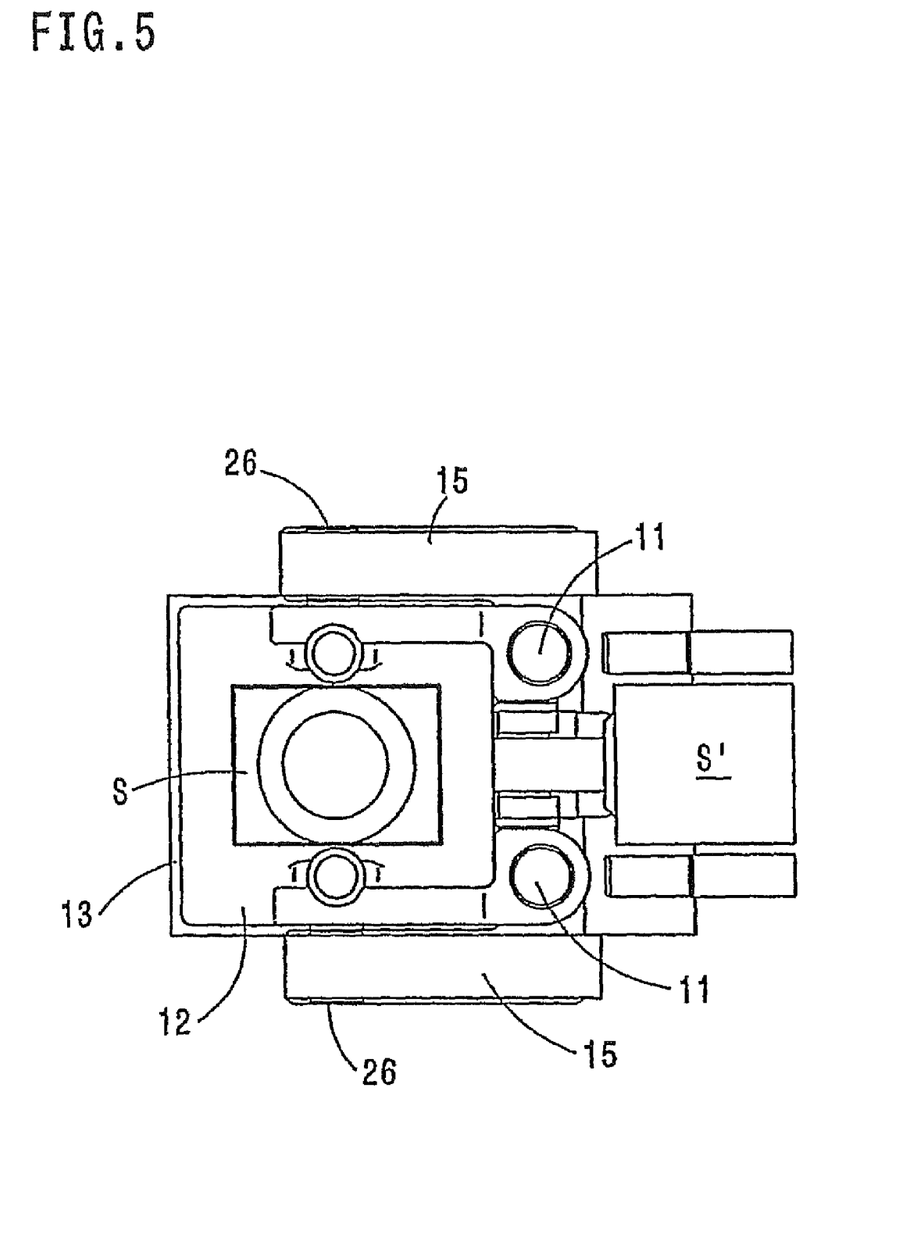
FIG. 5 is a top view of the injection molding machine in FIG. 1.

FIG. 2a and FIG. 4 show that, proceeding from the support plate 14, all the upper components no longer engage the machine frame 10 but are guided at a spacing from the machine frame. This allows the described movement of the mold closure upwards when the injection mold is opened. As mentioned above, this design does not exclude the injection molding machine being arranged in a horizontal manner. Where necessary, however, the brackets 15 could also be disposed such that they engage the machine frame 10 below and nevertheless are freely displaceable. This is more especially the case when, for example, the guide elements 11 are placed further outside, such that the space for the brackets 15 is created in the centre. Such an arrangement also contributes to a force transmission that is as central as possible.

The force transmitting element is a separate bracket 15, which is deformable in a substantial manner by the forces occurring when the mold M is closed. The bracket 15 is guided around the mold clamping area C, which is formed between the moveable mold carrier 12 and the stationary mold carrier 13. The force transmitting element, in this case, is formed by two brackets 15, which are disposed on both sides of the mold clamping area, the brackets being pivotally connected at one end to the moveable mold carrier 12 and at the other end to a connecting element 16, which is connected to the support plate 14. The length of the connecting element 16 is modifiable by means of a mold height adjusting device 18 in order to be able to adapt the toggle to different mold heights, that-is-to-say to adapt the dimension of the molds that can be accommodated in the mold clamping area in the closing direction s-s. When the mold height adjusting device is actuated, the parts of the connecting element 16 can be adjusted towards one another in the longitudinal direction. This type of mold height adjusting device is known to the man skilled in the art, which means that it does not require any further description here.

The injection molding units, two of which are schematically illustrated in the Figures, can be disposed in various ways on the mold closing unit F of the injection molding machine. One possibility is to dispose the injection molding unit S on top of the moveable mold carrier 12 and to displace it together with the moveable mold carrier 12. Another possibility, for example for injecting into the separating plane of the mold M, is to dispose the injection molding unit S' between the guide elements 11, it also being possible for it to be secured in a fixed manner to the said guide elements. If several injection molding units are necessary on account of the purposes of the application, these arrangements can be combined together.

The deforming element, that-is-to-say the bracket 15 is not guided directly but rather indirectly by means of its bearing points. The said bearing points on the one side are the pivotal connecting point 17 between the connecting element 16 and the bracket 15 as well as on the other side the pivotal connecting point 26 on the moveable mold carrier 12. These pivotal connecting points 17, 26 are disposed such that the bracket is pivotally mounted in a central manner, that-is-to-say in the closing axis or in a plane that passes through the closing axis. This produces a central force transmission that is advantageous for the precision of the machine. All the guide elements 11 both for the toggle movement and also for the guiding of the force transmission element are included in the lower stationary machine frame. The mold height adjustment, and consequently also the closing force adjustment, is effected by means of a separate spindle system between the pivotal connecting point 17 and the displaceable pivotal connection of the toggle system at the bottom.

Figure 6:
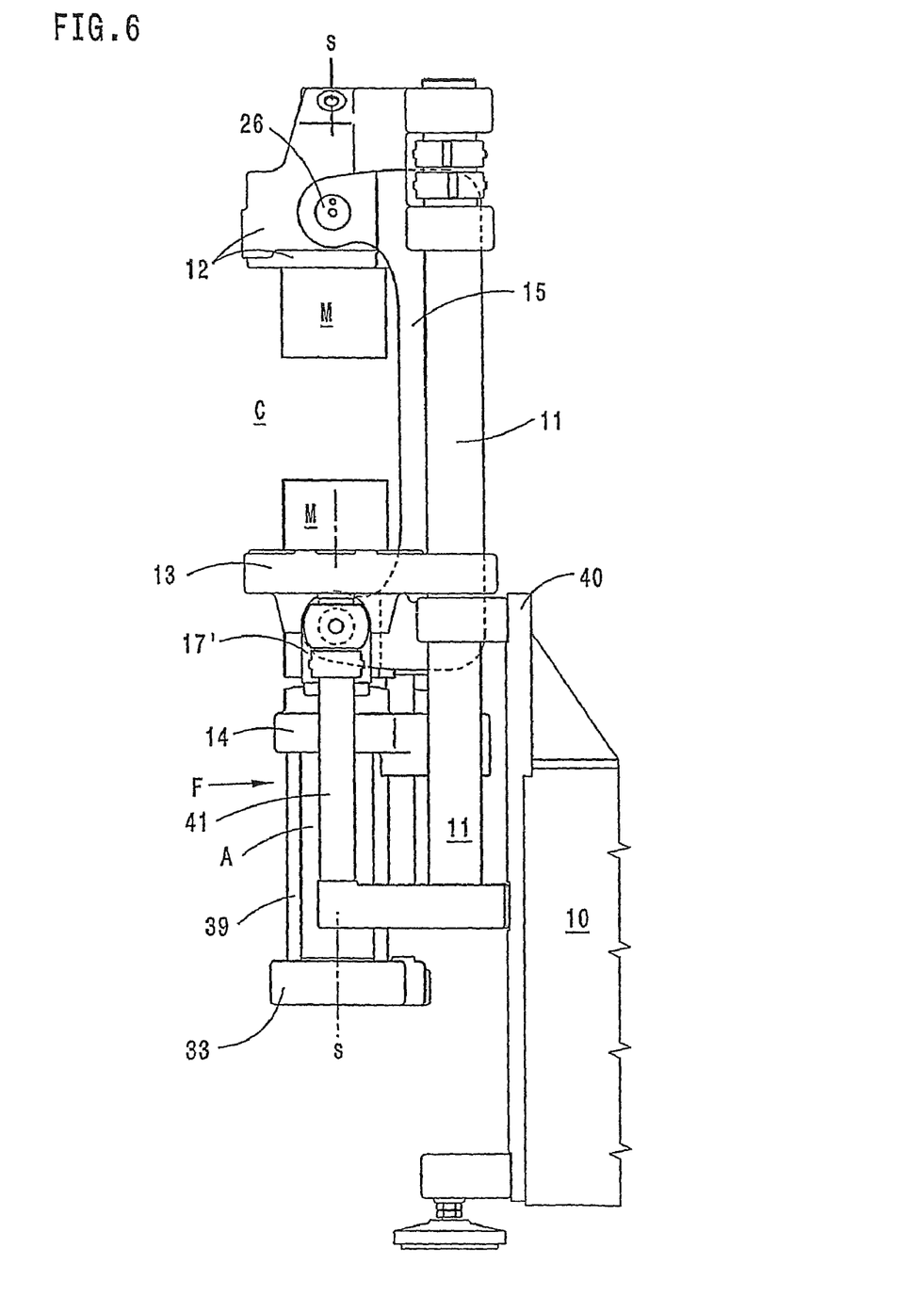
FIG. 6 is a view of an additional specific embodiment of an injection molding machine as in FIG. 3.
Figure 7:
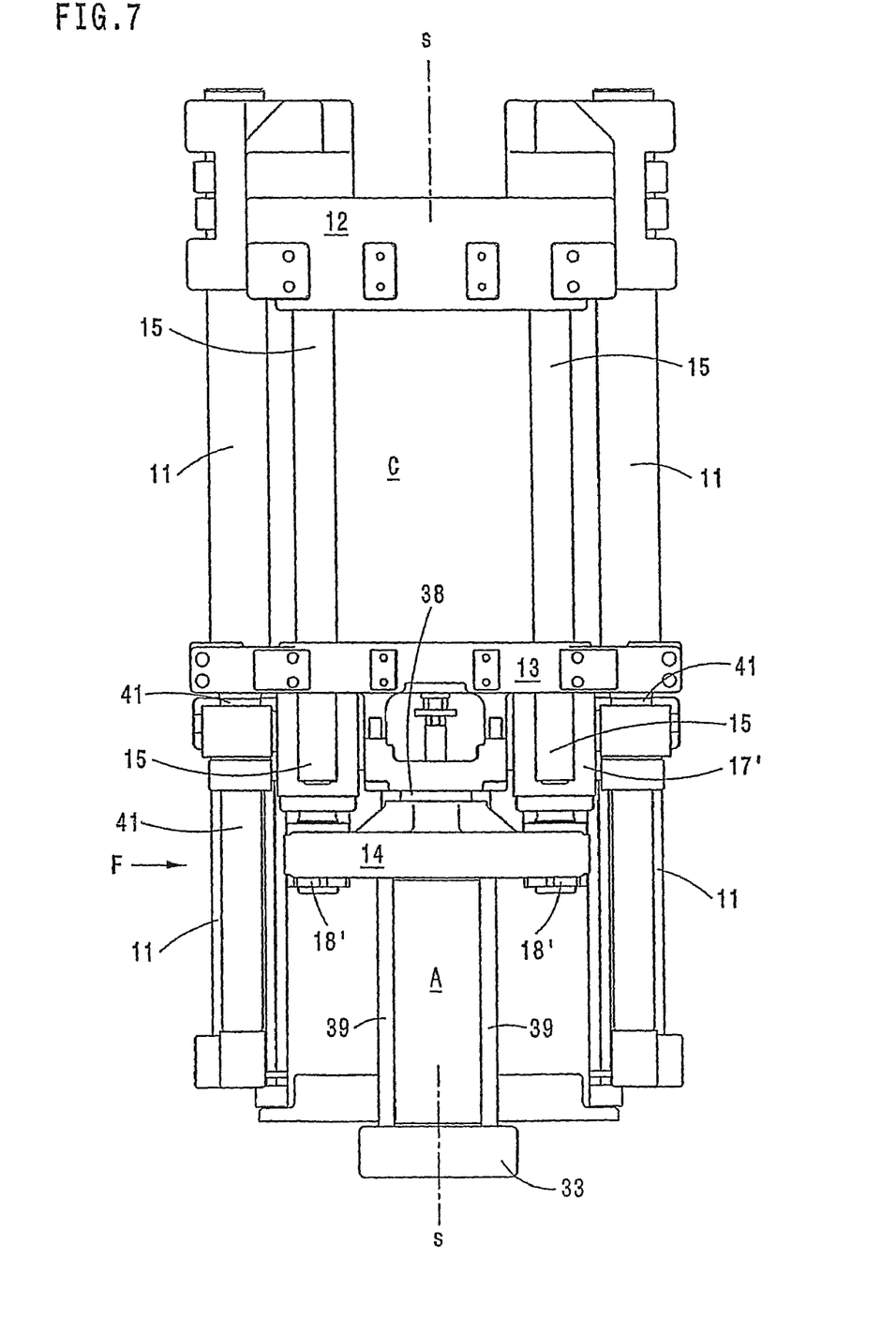
FIG. 7 is a front view of the injection molding machine in FIG. 6 with no injection mold assembly and no machine frame.

FIGS. 6 and 7 show an additional embodiment of the injection molding machine, the elements in the two embodiments being identified substantially with the same references. The essential differences to the first embodiment in FIGS. 1 to 5 are based on the type selected for drive A, in this case the drive is hydraulic and the first embodiment uses a toggle mechanism, and on the pivotal mounting on the machine frame. Whilst in the first embodiment the Y toggle engages laterally in the machine frame, in the second embodiment the mold closing unit F is attached to the machine frame 10, illustrated on the right in FIG. 6, by means of a bracket 40, it also being possible to provide a known swivel mechanism, not shown in the drawing, in order to operate the mold closing unit in a selective manner vertically—as shown in the Figures—or horizontally. Nevertheless, in this case too, the stationary mold carrier is also the fixed point relative to which the entire mold closing unit is displaced when the drive A is actuated.

An end plate 33 of the cylinder of the hydraulic drive unit A is clamped by the support plate 14 by means of bolts 39. The position of the drive unit relative to the support plate and relative to the mold carriers is adjustable by means of adjusting devices 18' to obtain plate parallelism between the stationary mold carrier 13 and the moveable mold carrier 12. When the drive unit is actuated, it moves, with the support plate 14, the pivotal connecting point 17' and consequently, moves the bracket 15 and the moveable mold carrier 12. The support plate 14 is displaced with this movement along the guide 41 and entrains, as-it-were, pivotal connecting point 17', bracket 15 and moveable mold carrier 12. The pivotal connecting point 38 shows the connection of the piston rod of the drive unit A to the stationary mold carrier 13.

In addition, in this embodiment the brackets 15 that surround the mold clamping area C are arranged inside and the guide elements 11 are arranged outside.

It is obvious that this description can be subject to the most varied modifications, changes and adaptations, which range in the region of equivalents to the attached claims.

The invention claimed is:

1. Injection moulding machine for processing plastics materials and other plasticisable compounds, the machine comprising:
   a machine frame,
   at least one injection moulding unit and a mould closing unit, both of which are operationally connected to the machine frame in an operating state,
   wherein the machine frame or at least a part thereof is associated with the mould closing unit as a stationary mould carrier and there is provided a moveable mould carrier, which, relative to the stationary mould carrier, is guided at guide elements, is movable in a closing direction in and out of mould closure, wherein additional parts of the mould closing unit are movable relative to the stationary mould carrier during mould closure, and
   wherein the mould closing unit comprises a drive unit for displacing the moveable mould carrier and, for this purpose, is in operational connection with the stationary mould carrier and, via at least one force-transmitting element, with the moveable mould carrier,
   wherein the drive unit is pivotally mounted at one end to the machine frame or the stationary mould carrier and is pivotally connected at the other end to a support plate, which is connected to the force-transmitting element and is movable in the closing direction,
   wherein the force-transmitting element is at least one separate bracket, which is deformable by forces substantially occurring when an injection mould assembly is closed.

2. Injection moulding machine according to claim 1, wherein the machine frame, on a horizontal face, forms the stationary mould carrier for a vertically operating mould closing unit.

3. Injection moulding machine according to claim 1, wherein the direction of closing is vertical or horizontal.

4. Injection moulding machine according to claim 1, wherein the at least one bracket is guided around a mould clamping area that is formed between the moveable mould carrier and the stationary mould carrier.

5. Injection moulding machine according to claim 1, wherein the force transmitting element, on both sides of a mould damning area that is formed between the moveable mould carrier and the stationary mould carrier, is pivotally mounted on one side at the moveable mould carrier and on the other side at a connecting element to the support plate.

6. Injection moulding machine according to claim 5, wherein the distance between the support plate and the pivotal connecting point of the connecting element at the force transmitting element is variable by means of a mould height adjusting device.

7. Injection moulding machine according to claim 1, wherein the guide elements for guiding the moveable mould carrier are separate elements, which are connected to the machine frame.

8. Injection moulding machine according to claim 1, wherein the guide elements, which are in a form of support braces, at the same time act as guide means for the support plate and/or the force transmitting element during movement in the closing direction.

9. Injection moulding machine according to claim 1, wherein a connecting element for the drive unit is suspended in a pivotable manner by means of two retaining elements that are pivotally mounted at pivotal connecting points of a toggle mechanism at the stationary mould carrier and at the support plate, to which retaining elements the drive unit is secured and, disposed transversely relative to the direction of closing, retained by the toggle mechanism so as to be freely movable, engages a drive element at an additional pivotal connecting point.

10. Injection moulding machine according to claim 1, wherein the drive unit is a hydraulic drive unit, which is mounted at the support plate by means of an adjusting device.

11. Injection moulding machine according to claim 1, wherein the injection moulding unit is connected to the moveable mould carrier for common movement.

12. Injection moulding machine according to claim 1, wherein the injection moulding unit is mountable for injecting into a separating plane between the guide elements.

* * * * *